US00RE50425E

(19) United States
(12) Reissued Patent
Marks

(10) Patent Number: US RE50,425 E
(45) Date of Reissued Patent: May 13, 2025

(54) COMPACT ELECTRIC SPRING ENERGIZED DESKTOP STAPLER

(71) Applicant: Worktools, Inc., Chatsworth, CA (US)

(72) Inventor: Joel Marks, Sherman Oaks, CA (US)

(73) Assignee: Worktools, Inc., Chatsworth, CA (US)

(21) Appl. No.: 18/161,669

(22) Filed: Jan. 30, 2023

Related U.S. Patent Documents

Reissue of:

(64) Patent No.: Re. 48,186
Issued: Sep. 1, 2020
Appl. No.: 16/532,571
Filed: Aug. 6, 2019

Which is a Reissue of:

(64) Patent No.: 9,962,822
Issued: May 8, 2018
Appl. No.: 15/371,162
Filed: Dec. 6, 2016

U.S. Applications:

(63) Continuation of application No. 13/943,644, filed on Jul. 16, 2013, now Pat. No. 9,522,463.

(Continued)

(51) Int. Cl.

| | |
|---|---|
| ***B25C 5/15*** | (2006.01) |
| ***B25C 5/00*** | (2006.01) |
| ***B25C 5/02*** | (2006.01) |

(52) U.S. Cl.

CPC ..... *B25C 5/15* (2013.01); *B25C 5/00* (2013.01); *B25C 5/0228* (2013.01)

(58) Field of Classification Search

CPC ..... B25C 5/15; B25C 5/0228; B25C 5/00; B25C 5/10; G03G 2215/00827

See application file for complete search history.

(56) References Cited

U.S. PATENT DOCUMENTS 1,655,275 A 1/1928 Place
1,845,617 A 2/1932 Metcalf ..... B25C 5/16 227/96

(Continued)

FOREIGN PATENT DOCUMENTS

CH 255111 A 6/1948
DE 3426072 * 1/1986

(Continued)

OTHER PUBLICATIONS

Partial English Translation of Japanese Patent Publication 58-137570 (Year: 1983).*

(Continued)

*Primary Examiner* — William C Doerrler
(74) *Attorney, Agent, or Firm* — Rankin, Hill & Clark LLP

(57) ABSTRACT

A compact, electric, spring energized desktop stapler having a unitized housing providing both an external movable enclosure and a support frame for internal parts is disclosed. The internal power train is preferably elongated with the motor at the rear, a gear set toward the center, and low profile lever and power spring assembly at the front. The lever engages a striker with a normal upper rest position where the power spring is deflected and energized. A cam roller mounted to a final gear holds down the rear of the lever until the system is activated when the final gear rotates and the cam roller rolls off the end of the lever. In the unitized body, the base is pivotally attached to the body at the rear. A base (Continued)

lever selectively links to a cam roller or equivalent structure to move the body downward toward the base during a cycle.

34 Claims, 8 Drawing Sheets

Related U.S. Application Data

(60) Provisional application No. 61/675,648, filed on Jul. 25, 2012.

(56) References Cited

U.S. PATENT DOCUMENTS 1,919,373 A 7/1933 Krantz
2,087,242 A 7/1937 Bunnell
2,137,642 A 11/1938 Caranagh
2,326,540 A 8/1943 Krantz
2,493,640 A 1/1950 Peterson
2,726,391 A 12/1955 Pilblad
2,755,474 A 7/1956 Spencer
2,769,174 A 11/1956 Libert
2,884,636 A 5/1959 Abrams
3,103,012 A 9/1963 Kohen et al.
3,276,654 A 10/1966 Yeager et al. ..... B25C 5/0228 227/131
3,278,101 A 10/1966 Hatazaki ..... B25C 5/15 227/7
3,282,489 A 11/1966 March ..... B25C 5/15 222/7
3,299,967 A 1/1967 Cabot et al. ..... B25C 1/06 173/201
3,346,163 A 10/1967 Manganaro ..... B25C 5/0228 227/131
3,380,640 A 4/1968 Singerman et al. ..... B27F 7/36 227/131
3,610,505 A 10/1971 Males et al.
3,666,157 A 5/1972 Kawai et al. ..... B25C 5/0228 227/131
3,758,016 A 9/1973 Olney et al.
3,810,572 A 5/1974 Malkin ..... B25C 1/06 227/132
3,940,044 A 2/1976 La Pointe
3,948,426 A 4/1976 La Pointe
4,126,260 A 11/1978 Mickelsson
4,367,833 A 1/1983 Kenney
4,450,998 A 5/1984 Ruskin
4,452,388 A 6/1984 Fealey
4,463,890 A 8/1984 Ruskin
4,530,454 A 7/1985 Gloor et al. ..... B25C 1/06 227/129
4,589,581 A 5/1986 Balma ..... B25C 5/0228 227/7
4,629,108 A 12/1986 Judge
4,726,505 A 2/1988 Okazaki ..... B25C 5/15 227/120
4,834,278 A 5/1989 Lin ..... B25C 1/06 227/131
5,007,572 A 4/1991 Chung-Cheng ..... B25C 5/0228 227/131
5,222,645 A 6/1993 Sueda ..... B25C 5/0228 227/7
5,320,270 A 6/1994 Crutcher ..... B25C 1/06 227/131
5,328,075 A 7/1994 Marks
5,335,838 A 8/1994 Harris et al.
5,335,839 A 8/1994 Fealey
5,356,063 A 10/1994 Perez
5,407,118 A 4/1995 Marks
5,413,266 A 5/1995 Jairam ..... B25C 5/0228 227/129
5,427,296 A 6/1995 Chen ..... B25C 5/0228 227/131
5,497,932 A 3/1996 Brewer et al.
5,503,319 A 4/1996 Lai ..... B25C 5/15 173/203
5,511,715 A 4/1996 Crutcher et al. ..... B25C 1/06 227/131
5,657,918 A 8/1997 Shimomura et al. ..... B25C 5/0228 227/131
5,660,314 A 8/1997 Magnusson et al. ..... B25C 5/04 227/131
5,664,722 A 9/1997 Marks
5,699,949 A 12/1997 Marks
5,816,470 A 10/1998 Plato et al.
5,988,478 A 11/1999 Marks
6,068,173 A 5/2000 Sueda ..... B25C 5/161 227/7
6,135,337 A 10/2000 Harris et al. ..... B25C 5/0228 227/131
6,145,728 A 11/2000 Marks
6,244,491 B1 6/2001 Kandasamy et al.
6,550,661 B2 4/2003 Aoki
6,626,346 B2 9/2003 Jairam et al.
6,634,536 B2 10/2003 Yoshie ..... B27F 7/19 227/131
6,789,719 B2 9/2004 Shor
6,811,070 B2 11/2004 Takada ..... B25C 5/1696 227/119
6,820,790 B2 11/2004 Ura ..... B27F 7/19 227/131
6,918,525 B2 7/2005 Marks
6,966,479 B2 11/2005 Tanaka et al.
6,997,367 B2 2/2006 Hu ..... B25C 1/06 173/202
7,011,243 B2 3/2006 Mochizuki ..... B27F 7/19 227/129
7,097,086 B2 8/2006 Joyce et al.
7,097,087 B2 8/2006 Lammers et al. .... B25C 5/0292 227/131
7,097,088 B2 8/2006 Shor
7,118,019 B2 10/2006 Marks
7,121,444 B2 10/2006 Joyce
7,124,922 B2 10/2006 Marks
7,124,924 B2 10/2006 Marks
7,140,526 B2 11/2006 Matsukawa
7,152,774 B2 12/2006 Chen ..... B25C 1/06 227/131
7,178,709 B2 2/2007 Marks
7,234,621 B2 6/2007 Marks
7,243,832 B2 7/2007 Jiang
7,299,958 B2 11/2007 Adams et al. ..... B25C 5/0228 227/120
7,311,238 B2 12/2007 Liu ..... B25C 5/0228 227/131
7,387,227 B1 6/2008 Jiang et al.
7,389,902 B1 6/2008 Co ..... B25C 5/15 227/120
7,395,955 B2 7/2008 Zins et al.
7,445,139 B2 11/2008 Okouchi ..... B25C 1/06 227/132
7,455,206 B2 11/2008 Huang ..... B25C 5/15 227/120
7,464,845 B2 12/2008 Chou
7,513,406 B2 4/2009 Marks
7,540,400 B2 6/2009 Zins et al.
7,543,728 B2 6/2009 Spasov et al. ..... B25C 1/06 173/202
7,571,537 B2 8/2009 Adams et al. ..... B25C 5/0228 227/7
7,681,771 B2 3/2010 Kandasamy et al.
7,708,179 B2 5/2010 Marks
7,748,589 B2 7/2010 Marks
7,823,759 B2 11/2010 Jiang
7,828,184 B2 11/2010 Marks
7,950,558 B2 5/2011 Marks
7,984,837 B2 7/2011 Palmquist et al. ..... B27F 7/36 227/131
7,992,756 B2 8/2011 Franz et al. ..... B25C 5/15 227/131

(56) References Cited

U.S. PATENT DOCUMENTS

| | | | | |
|---|---|---|---|---|
| 8,393,512 | B2 | 3/2013 | Tanimoto et al. | B25C 1/06 227/146 |
| 2004/0016789 | A1* | 1/2004 | Takada | B25C 5/0228 227/7 |
| 2005/0199675 | A1 | 9/2005 | Takada | B25C 5/0228 227/134 |
| 2005/0236458 | A1 | 10/2005 | Tsai | B25C 5/0228 227/155 |
| 2006/0151566 | A1 | 7/2006 | Ebihara | B25C 5/0235 227/134 |
| 2006/0266787 | A1 | 11/2006 | Ura | B25C 5/0228 227/131 |
| 2012/0181321 | A1* | 7/2012 | Chan | B25C 5/0228 227/129 |
| 2013/0228607 | A1* | 9/2013 | Marks | B25C 5/02 227/132 |

FOREIGN PATENT DOCUMENTS

| | | | |
|---|---|---|---|
| DE | 3426072 | A1 | 1/1986 |
| DE | 3638645 | * | 5/1988 |
| DE | 3638645 | A1 | 5/1988 |
| EP | 0231945 | * | 2/1987 |
| EP | 0231945 | A1 | 2/1987 |
| GB | 2229129 | A | 9/1990 |
| GB | 2260289 | * | 4/1993 |
| GB | 2260289 | A | 4/1993 |
| JP | 68137570 | * | 8/1983 |
| JP | S58137570 | A | 8/1983 |
| JP | 68137570 | A | 8/1993 |

OTHER PUBLICATIONS

PCT/US13/50995 International Search Report and the Written Opinion dated Dec. 23, 2013 (Year: 2013).*

CN 201380049671.0 First Office Action dated Dec. 1, 2015 (Year: 2015).*

* cited by examiner

200
M
202
201
+
REST

200
M
202
201
+
TRIP

200
M
202
201
+
RELEASED
PAPER IN

200
M
202
201
+
RELEASED
PAPER OUT

COMPACT ELECTRIC SPRING ENERGIZED DESKTOP STAPLER

Matter enclosed in heavy brackets [ ] appears in the original patent but forms no part of the first and this reissue specification; matter printed in italics indicates the additions made by the first reissue. Matter enclosed in double heavy brackets [[ ]] appears in the first reissue patent but forms no part of this reissue specification; matter printed in bold face indicates the additions made by this reissue; a claim printed with strike-through indicates that the claim was canceled, disclaimed, or held invalid by a prior post-patent action or proceeding.

CROSS-REFERENCE TO RELATED APPLICATIONS

This is a second application for reissue of U.S. Pat. No. 9,962,822 B2. The first reissue application was U.S. application Ser. No. 16/532,571, filed Aug. 6, 2019, which issued on Sep. 1, 2020 as U.S. RE48,186 E. U.S. Pat. No. 9,962,822 B2, issued on May 8, 2018 from U.S. application Ser. No. 15/371,162, filed Dec. 6, 2016, as a continuation of U.S. application Ser. No. 13/943,644, filed Jul. 16, 2013, now U.S. Pat. No. 9,522,463 B2, and claims priority [[from]] to U.S. Provisional [[Application]] App. Ser. No. 61/675,648, filed Jul. 25, 2012, [[and from co-pending parent application Ser. No. 13/943,644, filed Jul. 16, 2013,]] by the same inventor, the contents of which are incorporated by reference.

FIELD OF THE INVENTION

The present invention relates to an electrically energized stapler, and in particular, a compact spring energized desktop electric stapler.

BACKGROUND

Power operated staplers are known in the form of pneumatic and electrically powered devices. Such staplers are used for fastening in construction tools, and in the case of office type staplers, for binding papers. Powered office staplers are normally of the electric variety. Within the electric category common types are reduction gear driven by a motor, and impact driven through a solenoid. Gear driven types usually operate relatively slowly through cam or lever means. The slow operation allows a low peak electric current, for example through battery power or an alternate source of DC power from a line powered low voltage adaptor. An impact system through solenoid operates quickly, but requires high peak power, sometimes high enough to dim lights in an office setting. Further, the solenoid is expensive and bulky, including a large heavy copper winding. A further type of gear operated stapler uses the motor power to store energy in a spring, whereby the spring drives a staple by impact blow. However, these have required bulky structures.

In gear driven types, the amount of gear reduction required relates to the available power of the motor and the stapling energy required. A further important variable is the efficiency of the design. In some known prior designs there is substantial friction. Also in a design without spring energy storage the motor must drive through large changes in torque as the stapling cycle proceeds. As a minimum the gear reduction or motor size must allow for the peak forces of the cycle. This necessarily means the motor will operate well outside its peak efficiency loads or speeds for much of the cycle. A common such stapler may have four gear reduction stages to drive through such a cycle. A gear reduction device is also relatively slow typically requiring most of a full cycle to complete before the fastener is ejected. Further, the slow action makes such designs ill suited for use in construction tools since there is no anvil to press; the staple ejects too slowly to penetrate a wood or like surface.

In desktop use, pressing paper against or actuating a switch, or equivalent sensor, near the front of the stapler normally actuates the stapler. Commonly, the switch is to one side of the stapler. This facilitates manufacture of the device but leads to a loss of function—the actuation becomes sensitive to the angle in which papers are inserted. If the papers are angled toward the side with the switch, then the staple is installed too close to the edge of the page. If the angle is away from the switch, whereby the paper edge contacts an edge of the device opposite the switch, there may be no staple operation at all since the papers are obstructed from moving against the switch. The above-described behavior is a source of familiar unpredictability of operating electric staplers.

Some electric staplers allow for moving the position of the switch to change the location of the staple relative to the paper edge. The conventional side mounted switch is a known method to provide an adjustable switch position since it is known how to fit it beside the staple track in the various positions.

A common structure for an electric stapler includes an internal metal support frame and a separate external housing to form at least in part a double walled construction. With the support and enclosure functions separate, the overall size necessarily is large. For example, it is common that the external housing remains stationary while the internal frame moves down toward the anvil during a cycle. This requires ever more bulk to provide such movable mountings. Such a structure is complex and expensive. The very large housing is necessarily plastic to keep cost and weight reasonable. But such a large plastic structure often feels of low quality and amplifies noise.

SUMMARY OF THE INVENTION

The present invention provides improvements including size, efficiency, cost and usability to an electric stapler. In various preferred embodiments, it is of a gear motor type, with spring energy storage. The size in an exemplary 25 sheet capacity version is only slightly larger than that of a conventional manual stapler. A unitized housing provides both an external movable enclosure and a support frame for internal parts. The housing may be of either metal or plastic; if metal, such as die cast, is selected the support frame will be sturdy, the external size will be especially compact and noise transmission is minimized But plastic is a practical material also if desired. In either case the housing also normally provides the external appearance of the device.

The power train is preferably elongated with the motor at the rear, a gear set toward the center, and a low profile lever and an elongated power spring assembly at the front. The motor, gear set, lever and power spring are all preferably at a same or similar vertical level, being aligned in sequence along a length of the tool housing. Such alignment preferably includes the power spring and lever, with the power spring being largely remote from the front of the tool. One or both of the power spring and lever form a torque arm that is cantilevered from a pivot axis to the front of the tool. With the structure as described, the tool can be compact vertically along its full length and further it can be narrow in width at the front since there is minimal power spring structure at the front.

The lever engages a striker with a normal upper rest position. In this rest position, the power spring is deflected and energized. A cam roller mounted to a final gear holds down the rear of the lever until the system is activated. Upon activation the final gear rotates and the cam roller rolls off the end of the lever. The cam roller link is preferred over a non-rotating post since it will be of substantially greater efficiency without the sliding action of a post. However, a wheel is most useful when it is relatively large in diameter compared to a simple post. But with a larger diameter wheel, the wheel may release the end of the lever slowly as it rolls off the rear most corner of the lever. To reduce this effect, there may be a compliant link in the gear train to allow limited back motion between gear elements.

In accordance with a preferred embodiment unitized body, the base is pivotally attached to the body at the rear in a desktop configuration. This is consistent with a compact device that is minimally larger than a familiar desktop stapler. A base lever selectively links to a cam roller or equivalent structure to move the body downward toward the base during a cycle. There is no need for a stationary external shell although stationary elements may be included if desired.

In a preferred embodiment, the power spring is a double torsion type with arms extending forward from a common mounting. Optionally, an elongated wire or flat spring may be used. With the elongated spring, the spring structure, the lever and the power spring both extend rearward from the striker. They both remain substantially behind the striker so that the front end of the stapler can be preferably no larger than required to fit the striker, with respect to a front view.

The stapler of the present invention preferably includes an adjustable sensor switch. This sensor is activated upon contact or sense of a paper edge. The sensor is positioned at or near the center of the stapler body, with respect to a front view, just below the staple track. Being on center removes dependency on the angle of the paper. In contrast, for example, a conventional right side mounted sensor will trigger early if the paper is inserted with an angle further in on the right side. With the on center sensor, the stapling operation is closer to a user's expectations.

Along with the center mounted sensor the present invention preferably includes an adjustable sensor position along a length of the body. This allows a range of positions for a staple from the paper edge. A preferred embodiment sensor structure translates along the body and communicates with an elongated sensor bar in the body. Pressing anywhere by the sensor structure along the length of the bar actuates an electrical switch within the body. Therefore, the switch can be fixed in the body so that the connecting wires do not need to flex as in other adjustable switches. An adjusting wheel, rather than a detent slide, for example, moves the sensor for improved control of the sensor position.

In a preferred embodiment, the internal parts of the body all mount into one side. In this way there are no wires or connectors and minimal links to cross to the opposed side. This simplifies assembly and improves reliability.

DETAILED DESCRIPTION OF THE PREFERRED EMBODIMENTS

Figure 1:
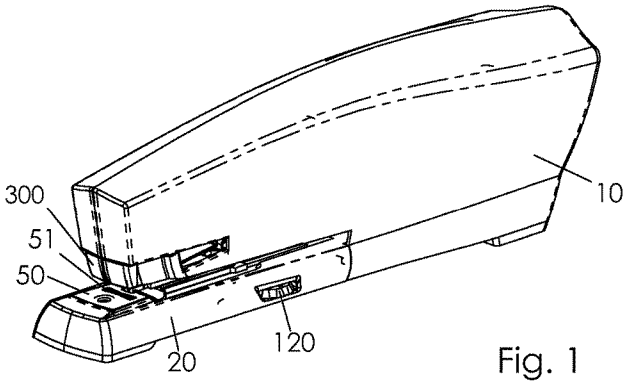
FIG. 1 is a top, front, left side perspective view of a preferred embodiment electric stapler according to the present invention.
Figure 4:
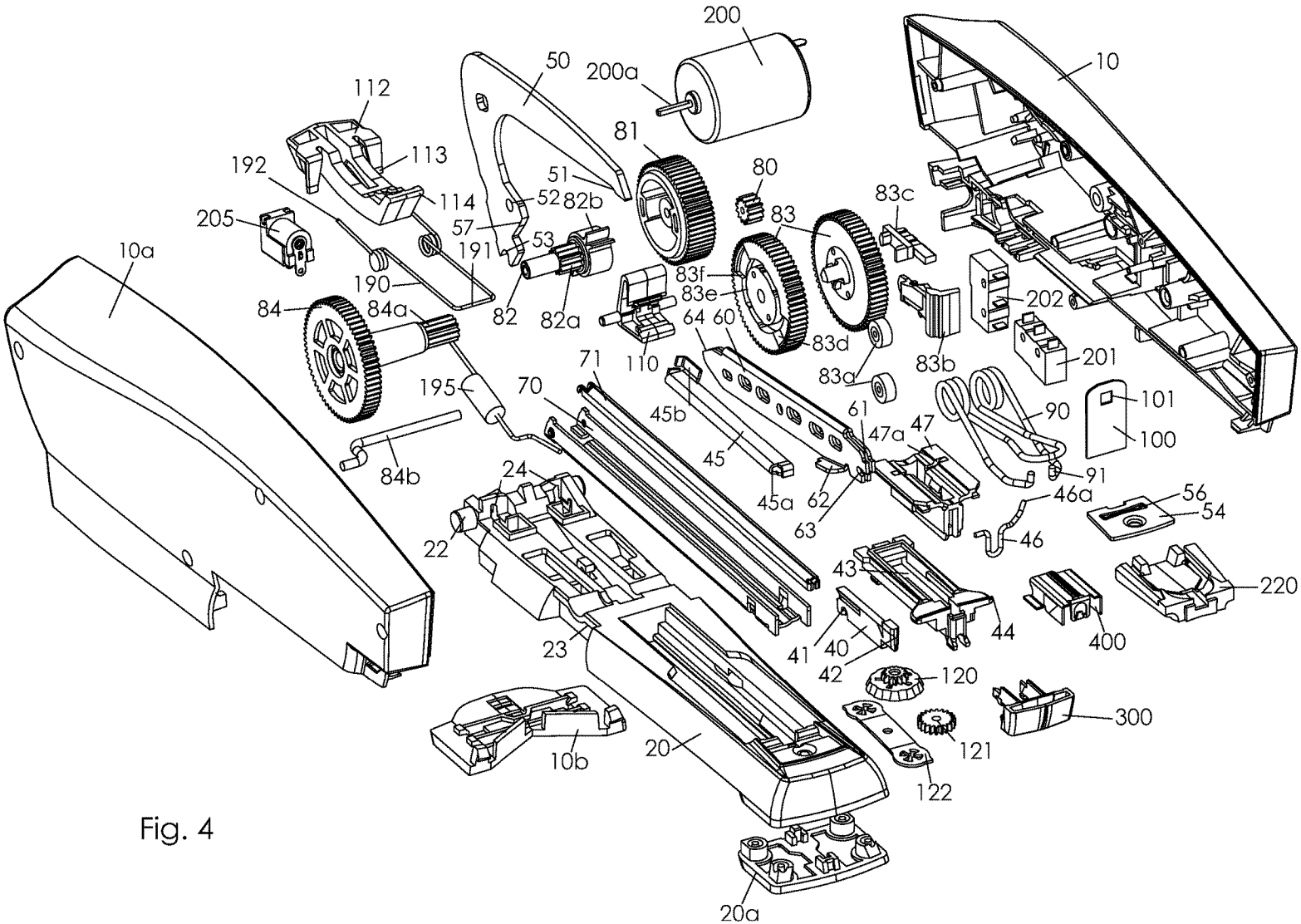
FIG. 4 is an exploded view of the components of the electric stapler.

The present invention is directed to a compact, spring-energized, electric stapler shown in the preferred embodiment of FIG. 1. FIG. 4 provides an exploded view of the major internal components of the stapler shown in FIG. 1.

Figure 5A:
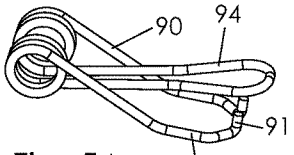
FIG. 5A is a power spring in an energized rest condition corresponding to its position in FIG. 5.
Figure 5:
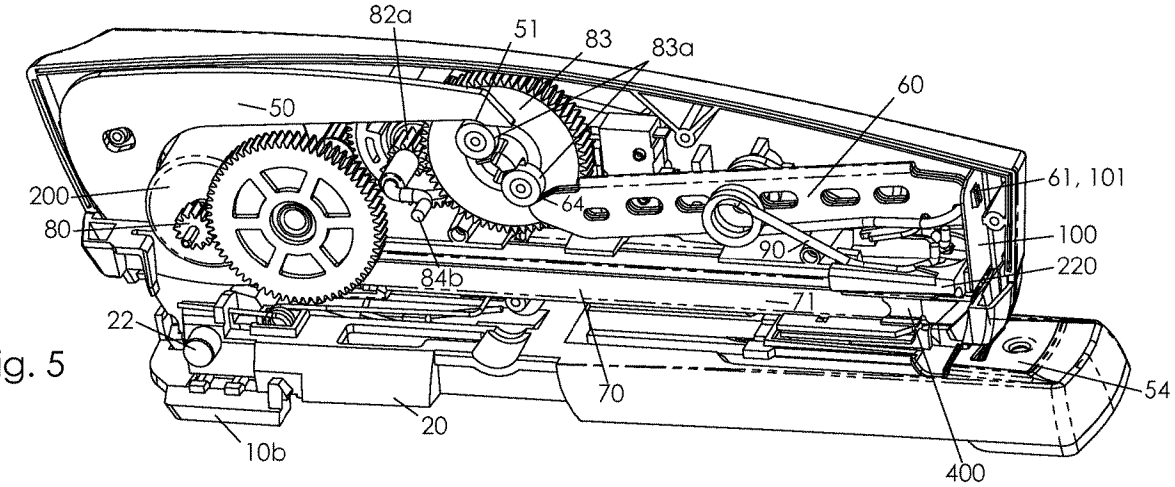
FIG. 5 is a top, right side perspective view of the electric stapler with the right housing omitted to show a rest condition of the components.

FIG. 5 shows some of the components of the preferred embodiment electric stapler of the present invention. Power spring 90 is in a deflected rest position as seen in the isolated view of FIG. 5A. Gear wheel 83 links to rear end 64 of lever 60 at the lower cam roller 83a. In the illustrated embodiment, there are two identical opposed gear wheels 83 to reduce the number of unique parts. However, the detailed features are fully used only in the left side gear, the gear shown for example in FIGS. 5 and 6. The right side gear provides support for axles (not shown) for cam rollers 83a, and optionally as a second mating gear for gear 82a. If the axles are of sufficient strength the right side gear may be omitted.

Figure 2:
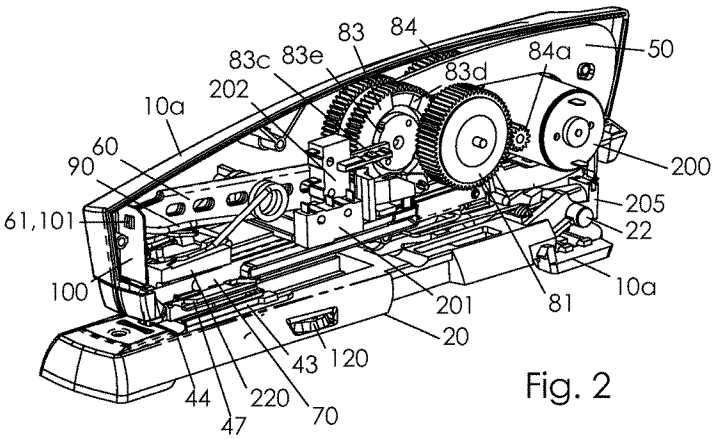
FIG. 2 is the stapler of FIG. 1 with a left housing omitted to expose internal components.
Figure 3:
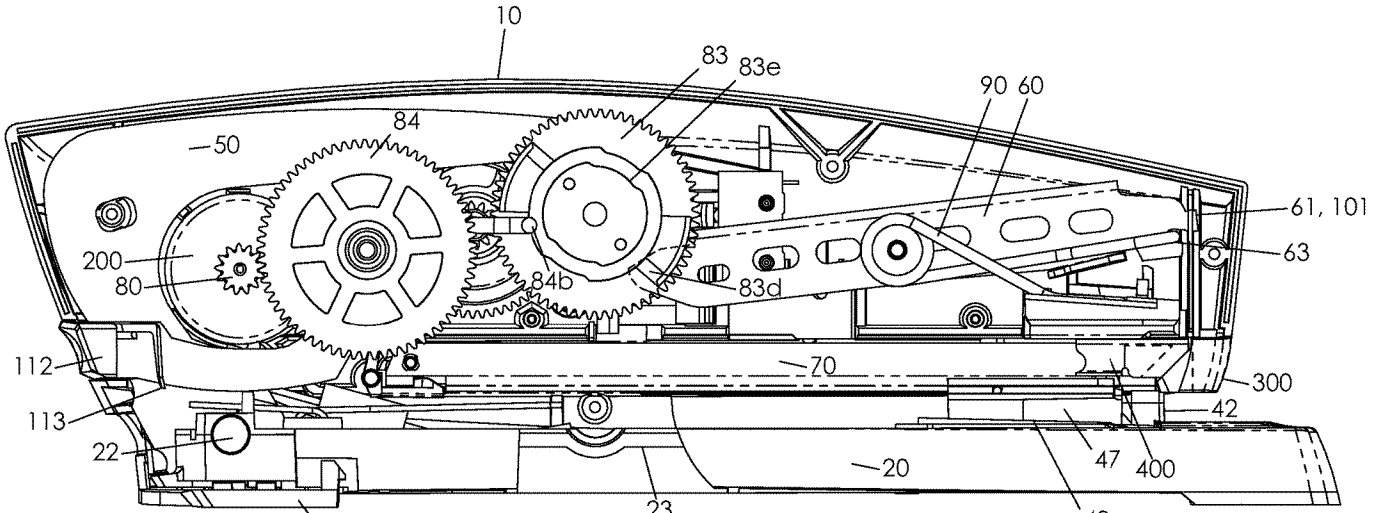
FIG. 3 is a right side elevation view of the electric stapler with the right housing omitted.
Figure 8:
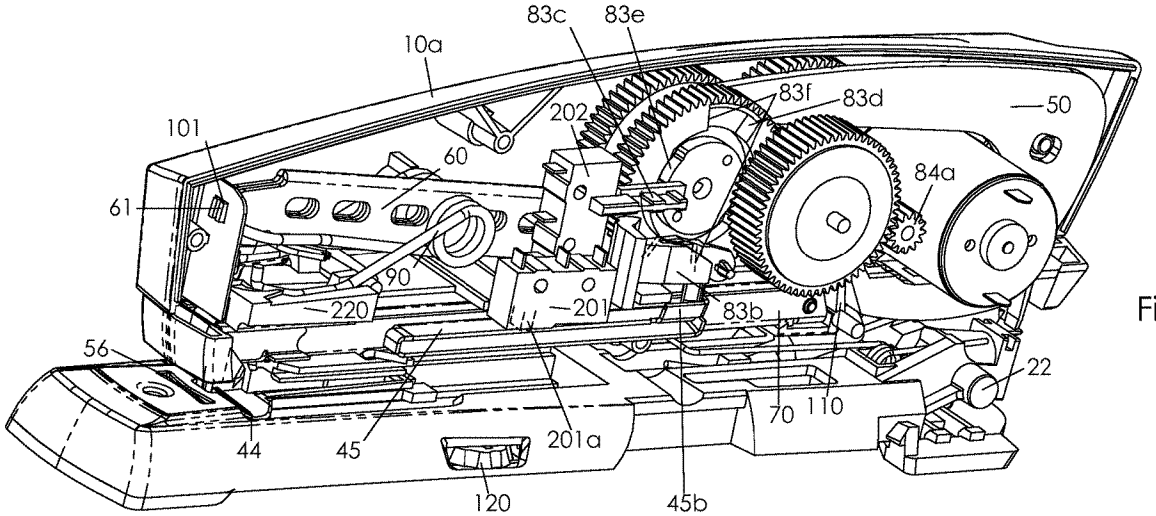
FIG. 8 is a top, left side perspective view of the stapler.

Gear wheel 83, or the first gear, is stationary in the normal rest condition of FIGS. 2, 3 and 5 whereby the power spring 90 is deflected and energized before a firing cycle. Ratchet detent 83b is movably attached to housing 10 to selectively engage catch rib 83f of gear wheel 83 (FIG. 8) to prevent backward rotation of the gear wheel from the rest position. Rib 83f of gear 83 is shown as a termination of a recess in a face of the gear. There are preferably two such recesses in the gear face, FIG. 4. Ratchet detent 83b remains proximate to rib 83f within the recess so that gear wheel 83 cannot reverse, counterclockwise in FIG. 5. Ramp 83d of the recess in gear wheel 83, FIGS. 4 and 8, allows detent 83b to ride smoothly out of the recess when gear wheel 83 turns in its normal direction.

Gear 83 or other linked element should be stopped in a consistent rest orientation without over spinning to an unstable toggle position that causes unintentional firing. This unstable condition is also discussed below in the context of gear link 82. As seen in FIGS. 3 and 5, roller 83a presses lever end 64 at an angle before its perpendicular relationship to the lever end, the toggle position. The two small circles on gear 83 correspond to the roller positions, while the rollers are not directly shown in FIG. 3. Described another way gear 83 rotates until roller 83a causes lever 60 to pivot near to but not entirely at its corresponding highest striker position. In this position, the force from power spring 90 causes a reverse rotational bias acting on gear 83, counterclockwise in the view of FIG. 3. Therefore, the electric motor controllers, discussed below, stop gear 83 sufficiently before the toggle position to ensure the gear does not over spin and cause firing of striker 100. Accordingly, the rotational position of detent 83b on gear 83, or equivalent structure, is such that lever 60 holds striker 100 near but not at its upper most possible position. The reverse bias on gear 83 against detent 83 then holds the assembly stable in the rest condition. Gear 83 may rotate in reverse slightly from the stop position to its rest orientation against the detent. It is then a short portion of the operating cycle to move the gear to the toggle and then release position. Preferably, there are two detent positions on gear 83 or equivalent structure as shown. Since gear 83 rotates one half turn per cycle each such detent corresponds to a single predetermined vertical position of striker 100 in each operating cycle. Optionally, more than two detents may be included.

As an operating cycle begins, gear wheel 83 turns clockwise in FIG. 5 and cam roller 83a rolls off rear edge 64 of lever 60. The lever 60 is free to move and energized power spring 90 forces or urges striker 100 downward to eject a staple (not shown) from track 70 by impact blow. Staple pusher 400 biases the staples or like fasteners to move toward striker 100. Pusher bar 71, FIG. 13A, supports a compression spring (not shown) that provides the spring bias to move pusher 400. Tabs 62 of lever 60 normally contact absorber 220 in the striker lowest position. Nosepiece 300 provides a front terminus to the track 70 and a guide channel for staples and striker 100.

Cam roller 83a is of sufficiently large diameter to usefully roll about a small axle (not shown) fitted to gear wheel 83. Alternatively, a post or sharp-edged hard rib of gear wheel 83 may be used to engage the rear of the lever 60. But using a roller provides substantially reduced friction between gear wheel 83 and lever 60. In using a relatively large cam roller, it will tend to roll off of lever end 64 slowly until the two are separated. After separation, the normal energy release and striker motion occur. But during separation there can be lost performance since lever 60 will be released slowly during the roll-off process. An analogy is a car tire rolling slowly off a curb. If the tire is reasonably large in diameter, the car can move downward slowly without damage. But in the case of a power spring, it is desirable to cause damage in the form of holes in the paper being stapled. If a small part of the lever motion is gradual, some of the potential energy in the spring is not available for impact action.

Figure 17A:
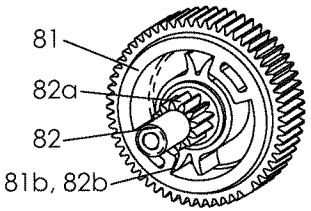
FIG. 17A is a perspective view of a gear and clutch subassembly in a drive condition.
Figure 17B:
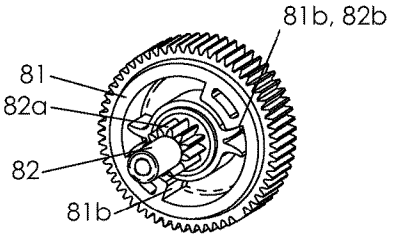
FIG. 17B is the same view as FIG. 17A, but with the clutch in a post-release condition.
Figure 20:
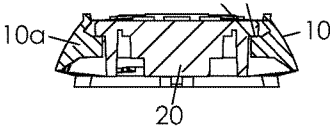
FIG. 20 is a cross-sectional view of FIG. 19 taken along line 20-20 showing a base stop limit rib.

To provide a low friction roller but maintain a sudden release, there can be free play or a compliant link in the system. Then the cam rollers can "flick" away from lever end 64. For example, the cam rollers may be loosely or slidably mounted to gear wheel 83. In the preferred embodiment, the free play is in the mated gear subassembly of FIGS. 17A and 17B. Gear link 82 includes gear 82a and stop ribs 82b, fitted into a recess of second gear 81. In the normal drive condition, second gear 81 rotates counterclockwise. Stop ribs 82b press recess ribs 81b of gear 81. Second gear 81 can thus drive gear 82a. This position of the subassembly is normally maintained in the rest condition of FIG. 5 as well as the moving drive condition. As cam roller 83a moves toward the lever distal end at 64 it becomes unstable. The action briefly reverses so that gear wheel 83 briefly drives gear 82a. Gear link 82 can freely move a predetermined angle within second gear 81. Forces within the gear subassembly of FIG. 17A then reverse to cause this angular motion to the position of FIG. 17B. Second gear 81 does not make any sudden motion, but inner gear link 82 and gear wheel 83 both move suddenly with gear wheel 83 moving clockwise to about the position of FIG. 6. In effect, cam gear 83 briefly overshoots the gear train driven by motor 200. The result of the above interaction is cam roller 83a does its roll-off instantly. Optional stop ribs 82b may be resilient extensions as shown, or equivalent absorbing structures in the gear subassembly, to cushion any impact of the sudden reversing motion. In an alternative embodiment roller design, a post or rib of gear wheel 83 may engage a roller fitted at end 64 of lever 60. The compliant link retains the same advantage.

Next, back in the gear train is third gear assembly 84 and 84a. Fourth gear 80 mates to motor 200 on shaft 200a. The gears are preferably made from molded plastic such as acetal or nylon. Other materials may also be used such as other plastics, ceramic, steel, die cast zinc, or machine cut bronze, or any combination thereof. In the preferred embodiment, there are three gear reduction stages for a reduction ratio of between about 100 to 120, including both outer limits and all values therebetween. In contrast, a conventional direct drive device with higher friction and large torque variations may require a ratio of over 150 to allow a practical size and motor. Using spring energy storage keeps the required motor torque relatively constant since the motor is used to deflect a spring rather than directly drive a staple. The motor can then operate near its peak efficiency through most of a cycle.

Figure 6A:
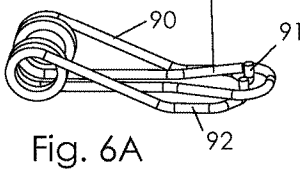
FIG. 6A is the power spring in a released and preloaded condition corresponding to its position in FIG. 6.

Power spring 90 includes upper loop 94 and lower arms 92. At the end of the lower arms is bent tip 91, FIGS. 5A, 6A. FIG. 5A corresponds to the rest condition of the stapler where the spring is deflected and energized. In FIG. 6A the spring is non-deflected in a preloaded condition. Arm tips 91 extend within loop 94 to hold the preloaded condition stable. By holding a deflected rest condition the stapler is prepared to operate immediately upon activation. There is no need to wait for wind up or cycling through an operation. Rib 15, FIGS. 14 and 18, holds lower spring arm 92 against upward forces so that spring arm 92 remains substantially stationary in the housing.

Figure 14:
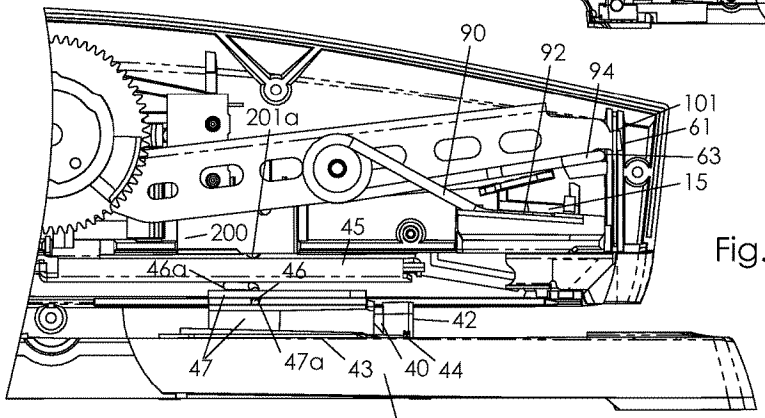
FIG. 14 is a detail view of FIG. 3 with the paper sensor subassembly adjusted to a rearward position.

Spring loop 94 fits to slot 63 of lever 60, FIG. 14. Lever tip 61 extends through opening 101 of striker 100, FIG. 8. Therefore, the striker and the lever move along with spring loop 94. The striker is held loosely on the lever tip as the striker moves up when spring 90 is energized, being gently guided by channel 11, FIG. 18. As a result there is minimal friction in a re-set energizing stroke as lever 60 lifts striker 100 against the downward bias from power spring 90. Alternatively, the lever and spring can engage the striker at separate locations of the striker. But then there will be sliding friction under force as the spring and lever oppose each other on the striker and are in and out of striker openings.

As seen in the drawing figures, lever 60 is elongated rearward from striker 100. Lever 60 pivots about a side to side or lateral axis, preferably but not necessarily at an axis concentric with a coil of power spring 90. In FIG. 3, the pivot axis goes into the page. Such orientation allows lever 60 to be elongated with minimal sliding at its arcuate engagement to striker 100. In FIG. 3, it is seen that the pivot axis is vertically coincident or aligned with gear 83 or other gears of the gear set. As discussed above, the lever 60 is preferably biased by power spring 90 or other type of spring. The lever 60 in turn drives striker 100. According to this structure as illustrated in the drawing figures, lever 60 has a spring energized torque applied to impart a vertical downward bias on striker 100. The torque is generated or applied substantially from rearward of the striker, at the coil of the power spring in the illustrated embodiment. The lever, spring, or spring through the lever, is cantilevered toward the striker to convert the torque to a downward force on the striker. More generally, striker 100 is driven downward in majority by a torque arm, in contrast to direct application of compressive or extensive spring force immediately at the striker location. The torque arm is the lever 60 or may include a further component, such as the power spring 90, near to the lever. In the example earlier, with the power spring directly engaging the striker, such engagement preferably remains nearest to or substantially vertically coincident with the lever at the striker location to maintain the vertically compact features of the preferred embodiment. Alternatively, the torque may be applied to the lever through the cantilever by an extension or compression spring linked to the lever and located rearward of the striker, or through a flat spring.

Housing 10 is compact at the front where the lever front end is adjacent to an interior ceiling of the housing in the rest condition, as seen in FIG. 3. The striker 100 is just tall enough to provide opening 101 to receive lever tip 61 for actuating the striker acceleration to eject a staple, yet still fitting within the compact front of housing 10. With the torque arm positioned as illustrated in the drawing figures between the motor and the striker, with all being at a similar vertical position, the operating elements are elongated and compact both vertically and laterally.

Figure 6B:
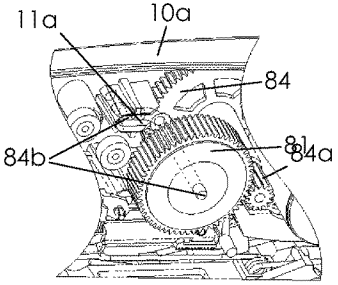
FIG. 6B is a detail view of the stapler toward the right housing showing an offset gear axle.
Figure 6:
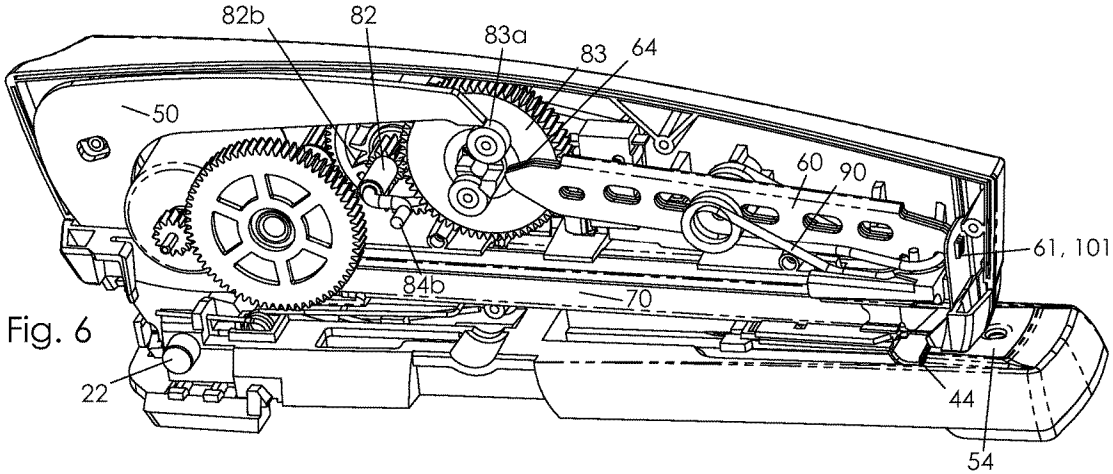
FIG. 6 is the stapler of FIG. 5 in a condition immediately after release of the striker to eject a staple.

In a paper fastening type stapler, as a staple is ejected, the staple exit end must be pressed toward the base as in FIG. 6. In a conventional electric stapler, the base and body are a single unit where the staple exit end moves downward internally within a housing. In the preferred embodiment of the present invention, the body and base motion are external. The body is a unitized construction with a single housing 10 and 10a providing both an exterior shell and the internal frame to support the working parts. The base 20 is preferably a discrete or separate element pivoted to the housing 10 and moves independently, separately from the housing. The preferred embodiment base 20 is substantially exposed outside the housing 10, 10a at least about the base sides, top and bottom near a front portion of the base. As illustrated, about half the base 20 is so exposed. This construction allows the design to be compact since the main structures are all single walled, i.e., without an internal frame or nested base. Base 20 includes foot 20a. A rear foot 10a is attached to housing 10 and moves with the housing.

Figure 18:
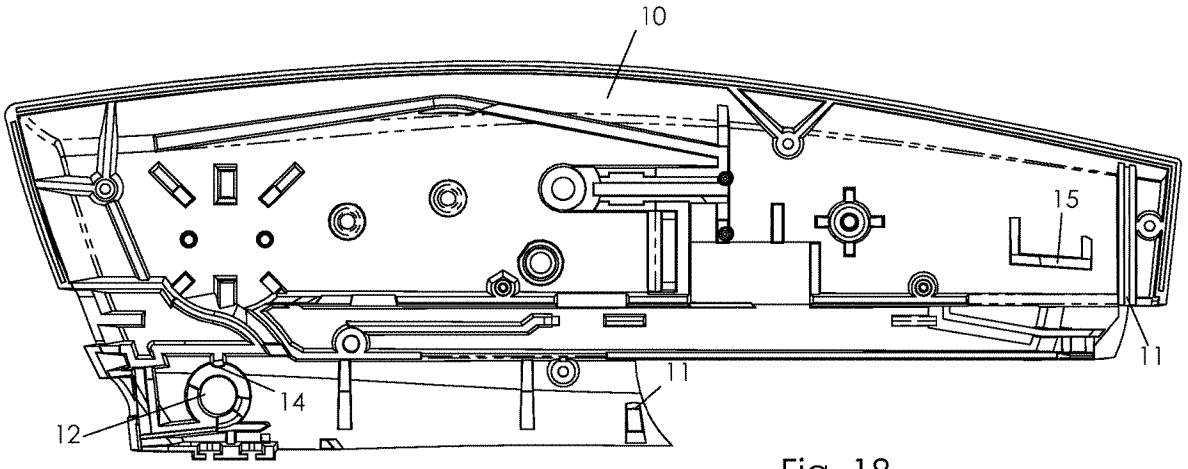
FIG. 18 is an internal side elevation view of a left housing of the stapler.
Figure 19:
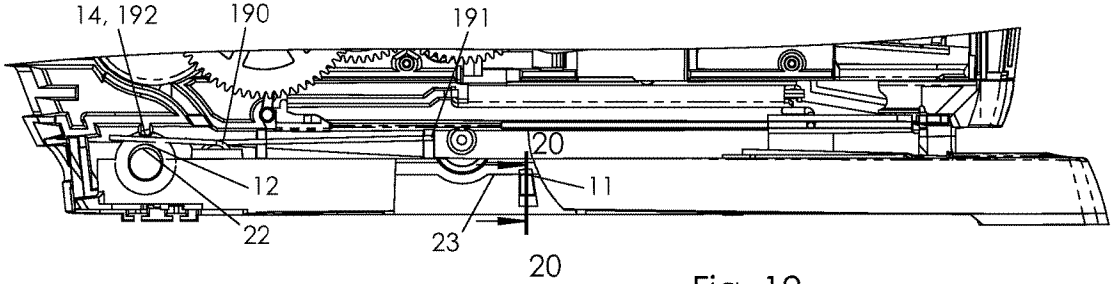
FIG. 19 is a detail view of an attachment of a base to the body of the stapler.

According to the preceding discussion, base 20 includes pivot post 22 to fit recess 12 of housing 10, FIGS. 18 and 19. Base link 50 is attached to base 20, discussed in further detail below. Pressing upward at cam 51 of link 50 causes base 20 to move toward housing 10. Base 20 can therefore close against the paper sheets to be stapled (not shown). In FIG. 5, one of the cam rollers 83a is positioned next to cam 51 but has not yet pressed it. Base 20 remains in its rest position spaced from housing 10. As gear wheel 83 rotates clockwise from FIG. 5 toward and including its position in FIG. 6, cam roller 83a forces link cam 51 upward. In FIG. 6 it is seen that housing 10 is moved against base 20. This action corresponds to just before and after the roll-off of lower cam roller 83a that leads to ejecting a staple.

Figure 10:
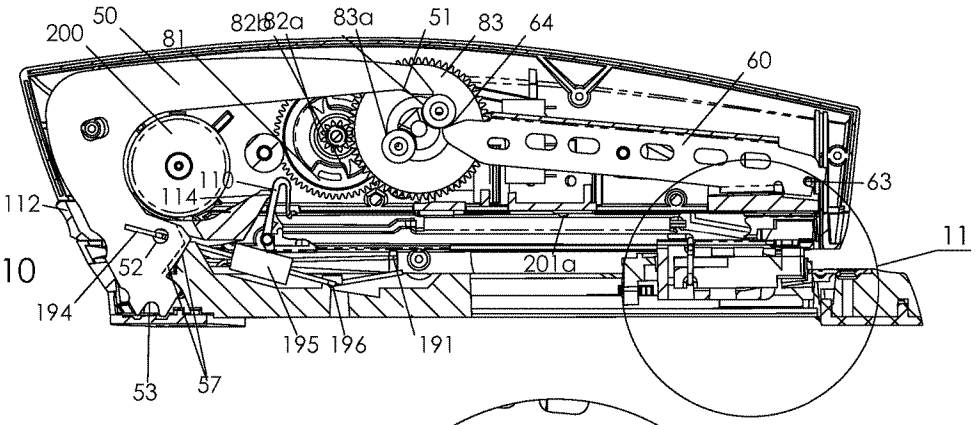
FIG. 10 is a cross-sectional view of FIG. 9 taken along line 10-10 with the stapler in the pre-energized condition of FIG. 7.

Normally there are papers (not shown) situated between the housing and base. In FIG. 6, the stack height would be zero since the base 20 and housing 10 are in contact. In fact, the stack height may be, for example, 0.10 inch for 25 sheets of typical paper. To allow for this height, link 50 is able to move relative to base 20 to avoid excess force on a rigid structure. Base link 50, FIG. 10, is pivotally mounted to base 20 at recess 53. Base spring 195 pulls the link at opening 52 so that edge 57 normally contacts a rearward face of base 20. Base spring 195 attaches at front end 196 to the base. Base link 50 and base 20 therefore can pivot together on housing 10 about pivot 22. But when there is an obstruction, such as a paper stack, base 20 can stop moving toward the housing and link 50 can continue to rotate counterclockwise in FIG. 10 under the force from cam roller 83a. The configuration of FIG. 10 would not actually cause the base to move since it shows a condition after a stapling operation just before the spring is energized. However, FIG. 10 shows a clear view of base link 50. FIG. 6 shows the closed base position, so if there were an obstruction to the base motion toward the closed position, there would be a space in front of link edge 57, as seen in FIG. 10, as link 50 rotates relative to the no-longer-moving base.

To provide an upper limit stop for housing 10 moving away from base 20, rib 11 of housing 10 selectively engages rib 23 of base 20, as seen in FIGS. 4, 18, 19 and 20. Base bias spring 190 holds the housing spaced a normal distance above the base by pressing upward at front end 191.

To remedy a jam, it can be useful to pull the base 20 open beyond its normal distance. For example, a malformed staple leg may get stuck in anvil 56, especially when stapling thick paper stacks. An optional feature of the present invention allows that the housing-base opening can be temporarily increased. Accordingly, recess 12 preferably is a slightly vertically elongated opening, FIG. 18, whereby post 22 is movable vertically within the recess. Normally, rear end 192 of the bias spring presses upward on rib 14 of housing 10 to hold post 22 pivotally at a bottom of recess 12. If base 20 is forcibly opened from its normal position, base rib 23 pivots slightly about a fulcrum of housing rib 11. Post 22 moves upward (not shown) in elongated recess 12 whereby the front of the base 20 moves away from the housing 10. Rib 24 of the base 20, FIG. 4, limits the position of spring rear end 192 to a preloaded condition in base 20.

Figure 7:
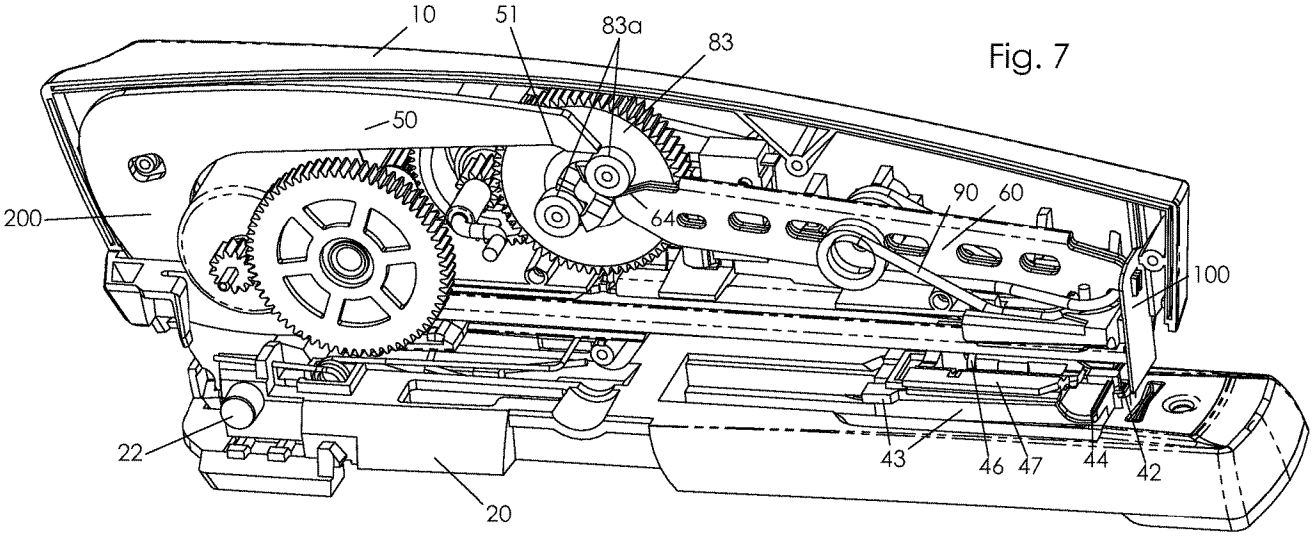
FIG. 7 is the stapler of FIG. 5 in a pre-energized condition.
Figure 11A:
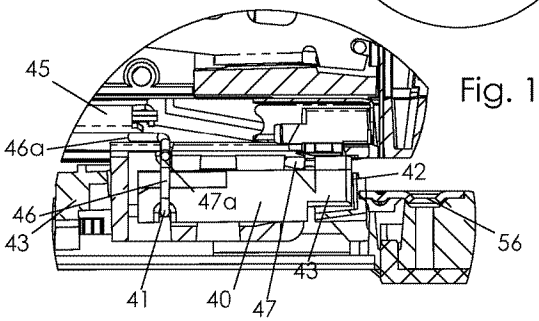
FIG. 11A is a detail view from FIG. 10 showing the paper sensor in a normal position.
Figure 11B:
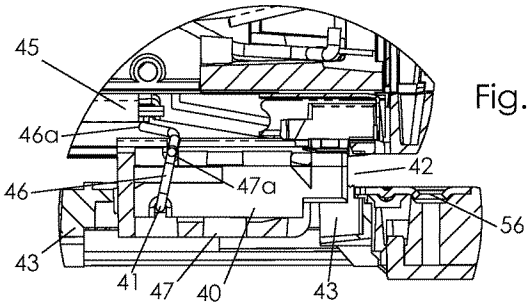
FIG. 11B is the view of FIG. 11A with the paper sensor in a pressed position.
Figure 9:
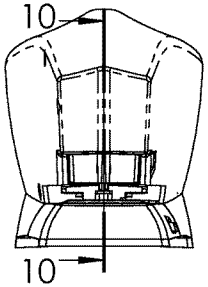
FIG. 9 is a front elevation view of the stapler.
Figure 12A:
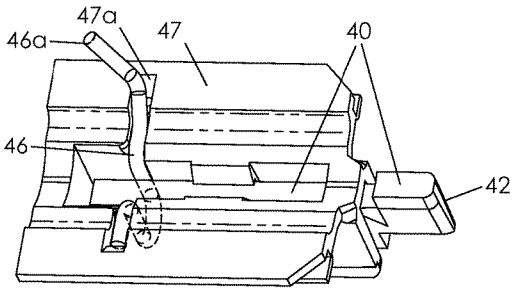
FIG. 12A is a top perspective view of a paper sensor subassembly in the normal position of FIG. 11A.
Figure 12B:
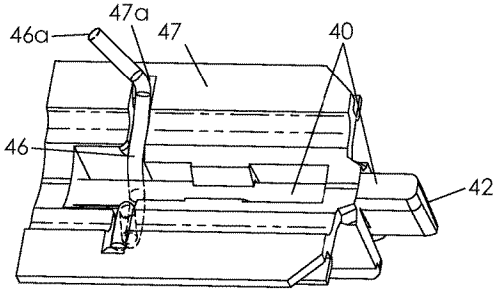
FIG. 12B is the view of FIG. 12A with the paper sensor in the pressed position.

The present invention in various preferred embodiments further contemplates improvements to a paper sensing system. A preferred embodiment sensor subassembly is shown in FIGS. 12A and 12B. Adjusting slide 47 is movable in a channel or equivalent structure along a length of housing 10. See also FIGS. 11A, 11B, 13A, and 13B. Sensor button 40 moves within slide 47 between a normal position (FIG. 12A) and a pressed position. These button positions are operable for any position of slide 47 along housing 10. In FIGS. 11A and 11B, slide 47 is in a forward most position. This corresponds to installing a staple closest to an edge of the paper. Sensor wire 46 is pivotally mounted to slide 47 at pivot 47a, and at a bottom to button 40 at recess 41, FIGS. 11A, B. The button is loosely held at its front within slide 47. Button 40 thereby moves easily within slide 47. The button 40 and supporting slide 47 are immediately adjacent and below track 70 rather than the conventional position of a switch beside the track. In the normal position, wire 46 is substantially vertical with end 46a being horizontal, FIG. 11A. As button 40 is pressed at button front 42, wire end 46a rotates upward, FIG. 11B. Sensor flap 45 is pivotally mounted to housing 10 at pivot 45a, FIG. 4. Wire end 46a causes flap 45 to rotate upward, FIG. 13B. Flap 45 selectively engages contact 201a of switch 201 to trip switch 201. See also FIG. 7 for the relative positions of flat 45 and contact 201a.

FIG. 14 shows a rearward position of slide 47. This corresponds to installing a staple farther from an edge of the page. The relationship between slide 47 and each of button 40, sensor wire 46, and flap 45 remains functionally unchanged for any selected slide position. Pressing paper against button front 42 creates the same result as for the forward slide position of FIG. 10. Specifically, pressing the button causes flap 45 and contact 201a to move as described above. With this structure thus described a paper sensor is on-center in the stapler and is also adjustable for depth.

Adjusting slide 47 may be directly moved within housing 10 to select a stapling position. For example, a tab of slide 47 may extend externally from a side of housing 10 (not shown) to allow a user to move the slide. In the preferred embodiment, depth pointer 43 surrounds or links to slide 47 whereby moving pointer 43 causes slide 47 to move. These components are visible together in FIG. 7 where the track and related components are removed for clarity. Also see FIG. 4 where slide 47 is directly above its operative position nested within pointer 43. Slide 47 can slide along housing 10 but is largely fixed lengthwise in pointer 43. Pointer 43 is slidable along the length of base 20 while slide 47 can move vertically in pointer 43 as base 20 moves to and away from housing 10. So slide 47 is slidably fixed to housing 10 while pointer 43 is slidably fixed to base 20. As pointer 43 is moved, it contacts slide 47 to cause the slide to move. As housing 10 pivots toward base 20, slide 47 moves downward into pointer 43. Pointer 43 includes its namesake indicator 44 to show where the paper edge will be when the stapler is activated.

Figure 15:
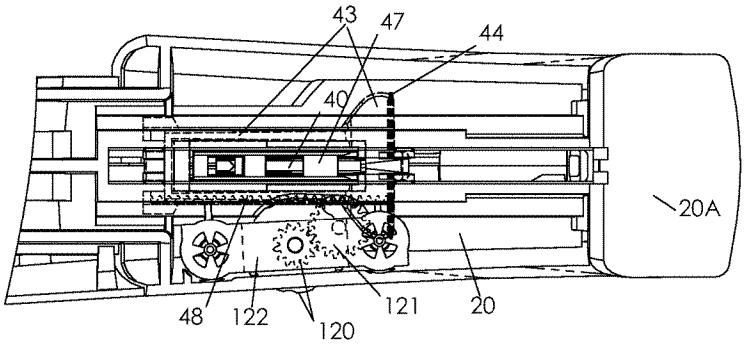
FIG. 15 is a bottom view of the stapler of FIG. 14 showing sensor position adjusting elements.
Figure 16:
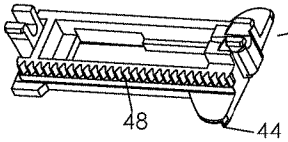
FIG. 16 is a bottom perspective view of a depth pointer.

As with slide 47, pointer 43 may be directly moved along the base by pushing at or near indicator 44 or other location. This may compromise the appearance and be difficult to control. Further, it can create asymmetric binding forces on the pointer unless the pointer is pushed from both sides. Although the above compromises do not preclude those options in the preferred embodiment, adjusting wheel 120 links to pointer 43 to allow moving the pointer. As seen in FIGS. 15 and 16, adjusting wheel 120 links to gear rack 48 of pointer 43 through gear 121. Retaining plate 122 holds the gear assembly in place in base 20. Adjusting wheel 120, or a linked component, preferably includes detent recesses or equivalent structures to engage base 20. For example, four recesses in a top face of adjusting wheel 120 can be seen in FIG. 4. Such detents provide tactile feedback to a user and hold a position for slide 47. Retaining plate 122 is flexible to provide some resilient vertical motion of the adjusting wheel to allow effective function of the detent action. A resilient detent may engage this system in other places or directions, for example, upon a side of pointer 43. By using a wheel with detents it is easy to accurately adjust the sensor position.

Pointer 43 is biased lengthwise by gear 121 relatively near a centerline of the stapler. This limits twisting and binding forces on pointer 43—such forces being in rotation with respect to the view of FIG. 16. In contrast, a tab of pointer 43 extending, for example, to the lowest position of adjusting wheel 120 in FIG. 16 would tend to twist and bind pointer 43 in its track on base 20. Optionally, an exposed sliding tab on base 20 is separate from pointer 43 to engage pointer 43; this would also reduce the torque arm on pointer 43 that causes binding.

Figure 13:
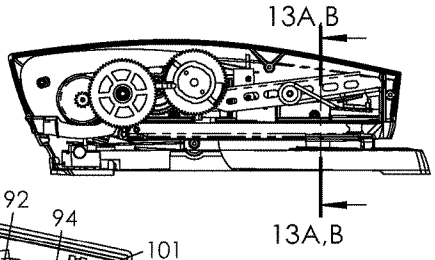
FIG. 13 is a reduced size view of FIG. 3 for cross-reference with FIGS. 13A and 13B.
Figure 13A:
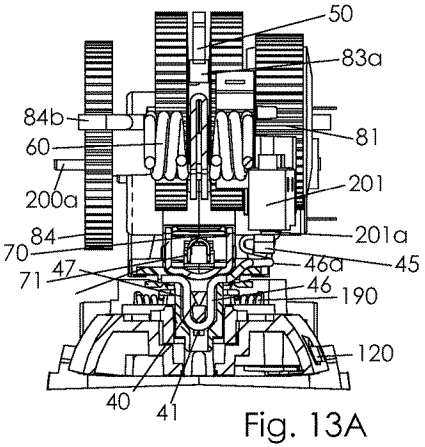
FIG. 13A is a cross-sectional view of the stapler of FIG. 13 taken along line 13A-13A, viewed from the front, showing the paper sensor in the normal position, with the housings omitted.
Figure 13B:
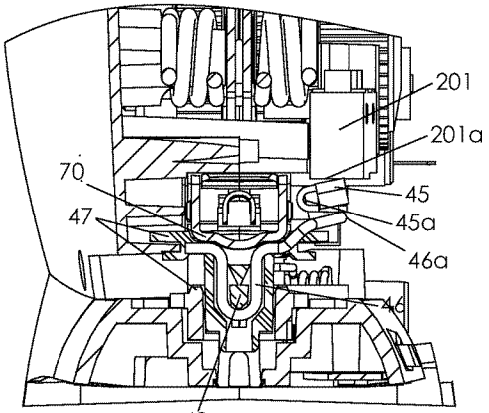
FIG. 13B is a cropped, cross-sectional view of the stapler of FIG. 13 taken along line 13B-13B, showing the paper sensor in the pressed position, with one housing half omitted.

Normally the sensor system is biased toward the normal positions of FIGS. 11A and 13A, with respect to the sensor flap, wire and button. The bias results from the spring force of contact 201a of switch 201 and the weight of flap 45. In the case that an obstruction or other abnormal event occurs, ratchet detent 83b discussed earlier preferably includes a further function to ensure re-set of the sensor system. Sensor flap 45 has a tab 45b, FIGS. 4 and 8. An extension of detent 83b selectively presses tab 45b as gear wheel 83 turns. Specifically, ramp 83d of the gear wheel drives ratchet detent 83b away from the gear wheel. Tab 45b is forced to move to rotate sensor flap 45 to its lowered rest position of FIG. 13A. In turn, sensor wire 46 and button 40 are forced or at least firmly biased to move to the normal positions shown in FIG. 11A. This back up system prevents improper continuous cycling in the event of sensor jams. But as noted previously, flap 45 with tab 45b is normally moved instead from the switch return bias and weight forces.

For control of the operating cycle, a second switch 202 (FIG. 8) is fitted. Gear wheel 83 includes cam track 83e. Switch link 83c moves according to the profile of cam track 83e of gear wheel 83, which in turn corresponds to the cycle positions of cam rollers 83a and lever 60. Switches 201 and 202 may be single pole double throw types. FIGS. 21A to D show switch states for switches 201 and 202 through the operating cycle. According to the function described, the stapler operates primarily or entirely by electromechanical switching without a need for electronic circuits, microprocessors, or components. This reduces manufacturing cost, component expense, and improves reliability. However, such components may be included if it is appropriate.

Figures 21A, 21B, 21C, 21D:
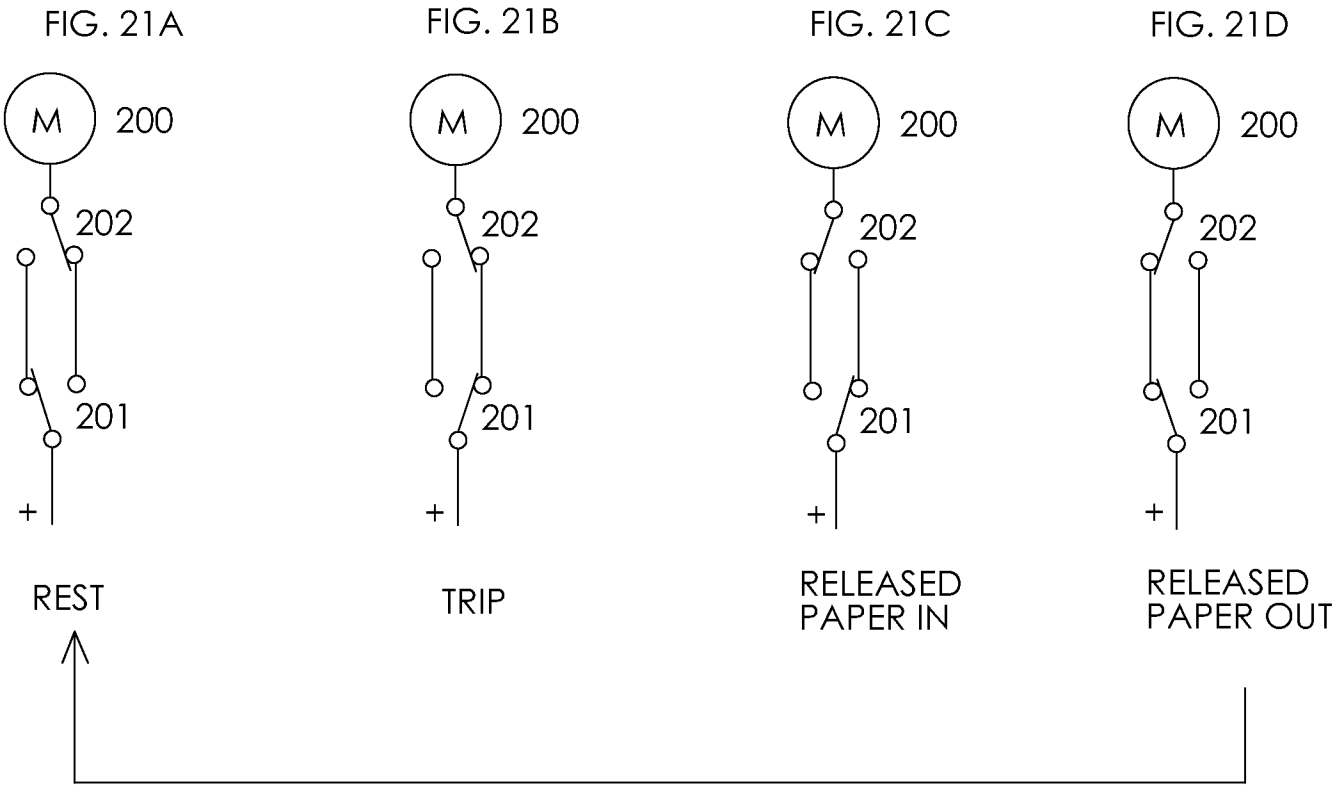
FIGS. 21A-D are electrical schematic views of switch states for an operating cycle.

FIG. 21A shows the rest state. This corresponds to the condition in FIG. 5. Motor 200 is isolated from power. FIG. 21B is the rest condition but with button 40 pressed by paper sheets to trip switch 201 and close the circuit to motor 200.

FIG. 21C is the released condition of FIG. 6. The paper is still in place immediately after ejecting the staple. Cam track 83e has rotated to a position to trip switch 202 to open the circuit and stop the gear motions. In FIG. 21D the user has removed the paper. Switch 201 moves to its normal position closing the circuit until cam track 83e advances to the original rest position to open switch 202 and stop the motion.

The switches are shown as mechanical contact type. Optionally, they may be in the form of proximity type, for example, magnetic or optical. Electric socket 205 is fitted tightly within housing 10.

Most of the gears and rollers preferably rotate upon simple posts or axles (not shown). For second gear 81, axle 84b may include an offset end as seen in FIGS. 6 and 6B. A straight axle would require a smaller diameter third gear 84 to clear the axle, reducing the available gear reduction. With the offset, axle 84b goes around third gear 84. The offset portion fits into slot 11a of housing 10a to stabilize the axle in the vertical direction, while the end fits into a round recess within the slot to hold the horizontal direction. The assembly of gears 84 and 84a extends substantially across the width of the body of the stapler with the respective gears at opposed ends. This provides clearance for various components and allows room for the offset of axle 84b.

Track 70 extends forward (not shown) to load staples. To extend the track release 110 is pressed forward by release button 112. Tip 114 presses the track release to rotate the track release and free the track. Release button 112 preferably includes integrated spring tabs 113 to hold the button in its normal rearward position in housing 10. Release button 112 preferably includes a relieved upper face to clear motor 200, visible in FIGS. 4 and 8.

In the disclosure there are references to housing 10. Where applicable this more generally refers to the body comprising housing halves 10 and 10a.

While particular forms of the invention have been illustrated and described, it will be apparent that various modifications can be made without departing from the spirit and scope of the invention. Furthermore, it is contemplated that features of one embodiment may be combined or used in another embodiment.

What is claimed is:

1. A compact, motorized fastening tool, comprising:
a body including a front, rear, top, bottom and sides;
a fastener guide track extending along the bottom of the body;
a striker at the front of the body including an upper striker position above the track and a lower striker position in front of the track;
a base pivotally attached to the rear of the body, the base extending forward under the body from the pivotal attachment to the front of the body;
a gear set disposed along a length of the body above the base, the gear set including a motor and gears linked thereto, the gear set supported within the body with gear set supports being substantially fixed in position on the body in relation to the fastener guide track through a normal operating cycle;
the body including an upper rest position with the front of the body spaced above a front of the base, and a closed base position of the body wherein the body is rotated downward toward the base;
a base link selectively engaging the gear set at a base link first end, the first end being within the body, a second end of the base link engaging the base; and
the gear set including at least the motor thereof, the body, and the guide track all pivoting together in relation to the base to reach the closed base position.

2. The motorized fastening tool of claim 1, wherein the base is discrete and separate from the body and substantially exposed to move outside the body.

3. The motorized fastening tool of claim 1, wherein [a] *the* top of the body is largely externally exposed, and to assume the closed base position, the exposed body top moves downward toward the base.

4. The motorized fastening tool of claim 3, wherein the body comprises both of an outermost shell and an internal support frame, and wherein the outermost shell with the internal support frame move downward toward the base.

5. The motorized fastening tool of claim 1, wherein the base link partly surrounds the gear set within the body, and an upper arm of the base link extends to the first end above the gear set and a rear arm of the base link extends downward to the second end rearward of the gear set.

6. The motorized fastening tool of claim 5, wherein the rear arm passes rearward of the fastener guide track.

7. The motorized fastening tool of claim 1, wherein the base link includes a resilient connection between the body and the base wherein the body can be normally, forcibly moved away from the base by deflection of the resilient connection.

8. The motorized fastening tool of claim 1, wherein a final gear of the gear set includes cam features, and the cam features selectively engage the base link first end.

9. The motorized fastening tool of claim 8, wherein the cam features engage both the base link first end and a striker actuation lever wherein a timing of striker motion and body-to-base motion is coordinated.

10. The motorized fastening tool of claim 9, wherein the cam features include rollers fitted to the final gear.

11. The motorized fastening tool of claim 10, wherein the final gear includes two attached, diametrically opposed rollers, and at a predetermined rotational position of the final gear, a first [ [roller] ] one of the two attached, diametrically opposed rollers presses the base link first end to pivot the body on the base and a second [ [roller] ] one of the two attached, diametrically opposed rollers actuates the striker to move within the body.

12. A compact, motorized fastening tool, comprising:
a body with a front, rear, top, bottom, and sides;
a fastener guide track disposed along the bottom of the body;
a striker disposed at the front of the body including an upper striker position above the track and a lower striker position in front of the track;
a motor supported on the body toward the rear of the body;
a gear set engaging the motor, the gear set mounted and supported by the body;
a pivotal attachment of the base to the to the rear of the body, the base extending forward under the body from the pivotal attachment to the front of the body; and
the base and body having separately movable external structures of the fastening tool wherein each of the motor, the gear set, and the body moves in the same manner together about the pivotal attachment toward the base during a normal operating cycle.

13. The motorized fastening tool of claim 12, wherein *the body is* a unitized body *that* provides both an external shell enclosure and a support frame for internal parts including internal structures to guide and support the gear set and motor, the internal parts moving together with the external body shell toward the base about the pivotal attachment during the normal operating cycle.

14. The motorized fastening tool of claim 12, wherein the body along with the striker is driven toward the base during the normal operating cycle, and with the body held in a closest position against the base, the striker is pushed downward in a channel of the body toward the base.

15. The motorized fastening tool of claim 13, wherein the guide track normally remains fixed in position on the body through a full operational cycle.

16. The motorized fastening tool of claim 12, wherein a base link selectively links the body to the base to cause the body to move toward the base, and a final gear of the gear set includes two attached, diametrically opposed cam rollers, and at a predetermined rotational position of the final gear, a first [[roller]] one of the two attached, diametrically opposed cam rollers presses a base link first end and a second [[roller]] one of the two attached, diametrically opposed cam rollers actuates the striker to move within the body.

17. The motorized fastening tool of claim 16, wherein the base link includes an upper arm extending to the base link first end over the gear set and motor, a rear arm extends downward behind the gear set, and the base link includes a resilient connection to the base wherein the base, in its position nearest the body, is normally forcible away from the body by deflection of the resilient connection.

18. The motorized fastening tool of claim 17, wherein the rear arm extends downward behind the guide track.

19. The motorized fastening tool of claim 12, wherein the base is substantially entirely externally exposed at a front portion, and the body normally moves downward toward the exposed front portion, and the base lies substantially entirely below the guide track.

*20. A spring assembly of a fastening tool, comprising:*

*a housing with a front, rear, top, bottom and sides;*

*a fastener guide track along the bottom of the housing;*

*a striker at the front of the housing including an upper striker position above the track and a lower striker position in front of the track;*

*a lever and power spring disposed at a front of the housing, wherein the lever is elongated rearward along a length of the housing, the power spring being a torsion type acting on the striker in majority through a torsional connection to cause a downward bias on the striker;*

*the power spring including a first spring end movable with respect to the housing, the first spring end linked to the striker to move with the striker, a second spring end, and a structure of the power spring disposed between the first and second spring ends extending substantially behind the striker;*

*the power spring being elongated including a first arm extending forward from a coil of the power spring to the first spring end adjacent to the striker, a second arm of the power spring extends from the coil to the second spring end;*

*the first spring arm being above the second arm in a deflected energized condition of the tool, and the spring is not deflected in a released condition of the tool wherein the first arm is moved down to be adjacent to the second arm; and*

*the second spring arm including a segment angled with respect to the first spring arm wherein the angled segment passes under the first spring arm, the angled segment being adjacent to the first spring arm whereby the spring is preloaded in the released condition, and the angled segment being moved away from the first arm under a bias from the lever in the deflected energized condition.*

*21. The spring assembly of claim 20, wherein the first spring arm is below the second spring arm adjacent to the coil, and the first spring arm passes beside the second spring arm to be above the second spring arm at distal portions of the arms further away from the coil.*

*22. The spring assembly of claim 20, wherein the second spring end includes a vertically extending portion adjacent to the first spring arm, the vertically extending portion passing beside the first spring arm to extend upward from below the first spring arm in the released condition of the tool.*

*23. The spring assembly of claim 22, wherein the second spring end includes a bent tip, and the tip includes the vertically extending portion.*

*24. The spring assembly of claim 20, wherein the first spring arm directly engages the striker.*

25. The spring assembly of claim 20, wherein the first spring arm extends forward below the second spring arm adjacent to the coil, and the second spring arm gasses beside the first spring arm to be below the first spring arm at portions of the respective arms further away from the coil.

26. The spring assembly of claim 20, wherein the first spring arm is spaced above a distal portion of the second arm in a deflected energized condition of the tool.

27. The spring assembly of claim 25, wherein the second spring arm segment is angled laterally with respect to the first spring arm, and wherein the spring is held stable in the preloaded condition.

28. The spring assembly of claim 21, wherein the coil and the arms comprise a wire form, and the second arm includes a sequence of bends of the wire, a first bend forward of the coil, and a second bend further along the wire of the second arm toward a second arm distal end, the bends of the sequence directing the wire of the second arm to pass below the first arm to hold the preloaded condition stable.

29. The spring assembly of claim 28, wherein the second bend directs the wire of the second arm to pass below the first arm in the preloaded condition.

30. The spring assembly of claim 28, wherein the sequence of bends includes a bent tip of the second arm forming a termination of the second arm, and the bent tip holds the preloaded condition of the power spring stable.

31. The spring assembly of claim 20, wherein the first arm includes a bend in a wire of the first arm, the bend directing a distal segment of the wire of the first arm at a lateral angle in relation to the second arm whereby the first and second arms are relatively laterally angled at the distal segment of the first arm in the preloaded condition of the spring, and the distal segment of the first arm passes the second arm adjacent and above the second arm in the preloaded condition of the spring.

32. The spring assembly of claim 20, wherein the second arm includes a bend in a wire of the second arm to form a bent distal segment of the wire whereby, in the preloaded condition of the spring, the bent distal segment passes adjacent and below the first arm from one side of a wire of the first arm to an opposed side of the wire of the first arm.

33. The spring assembly of claim 21, wherein the second spring end includes a vertically extending portion adjacent to the first spring arm, the vertically extending portion passing beside the first spring arm to extend upward from below the first spring arm in the released condition of the tool.

34. The spring assembly of claim 33, wherein the second spring end includes a bent tip, and the tip includes the vertically extending portion.

* * * * *